June 6, 1950 — E. W. CARR — 2,510,682
TRACTOR TIRE CHAIN
Filed Oct. 22, 1947

Inventor
Earl W. Carr

By Clarence A. O'Brien
and Harvey B. Jacobson
Attorneys

Patented June 6, 1950

2,510,682

UNITED STATES PATENT OFFICE 2,510,682

TRACTOR TIRE CHAIN

Earl W. Carr, Pulaski, N. Y.

Application October 22, 1947, Serial No. 781,275

2 Claims. (Cl. 152—228)

The present invention relates to a tire chain which is expressly, but not necessarily, adapted for use on pneumatic tires such as are employed on tractors and other types of farming machines and the primary object of the invention is to provide a chain construction having circumferentially spaced traction units, the latter being arranged some eight inches apart around the tread portion of the tire.

In carrying out the principles of the invention I provide a novel and improved tractor tire chain which is characterized by suitably constructed and fastened circumferential side chains, the aforementioned circumferentially spaced traction units, and transverse links operatively connecting the corner portions of said units to said side chains.

In reducing to practice the preferred embodiment of my invention I provide traction units each in the form of a substantially rectangular openwork frame, said frame being made up of spaced parallel transversely disposed angle irons, the outstanding flanges thereof constituting traction lugs and the remaining flanges serving to provide foundational contact with the said portions of the coacting tire and also serving to accommodate longitudinally extending connecting bars, whereby to provide in each unit requisite self-clearing and reliable traction properties.

Another object of the invention is to provide, in a chain of the type specified, duplicated traction units which are simple in construction, strong and durable, susceptible of manufacture on a desirable economical basis, and are otherwise adequate to attain the desired surface gripping and driving results.

Other objects, features and advantages will become more readily apparent from the following description and the accompanying illustrative drawings.

In the drawings, wherein like numerals are employed to designate like parts throughout the views.

Figure 1:
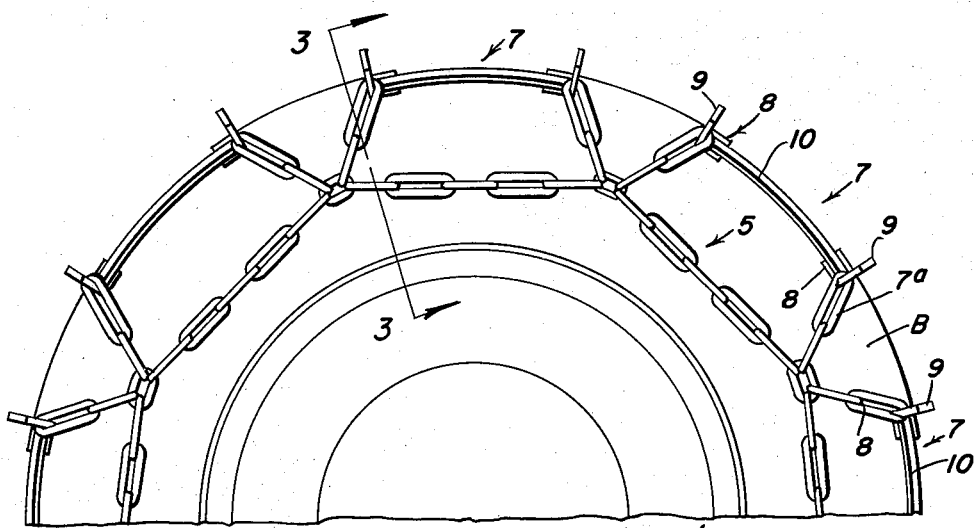
Figure 1 is a fragmentry side elevational view of a tractor wheel tire and the improved tire chain as constructed in accordance with the principles of the present invention.
Figure 2:
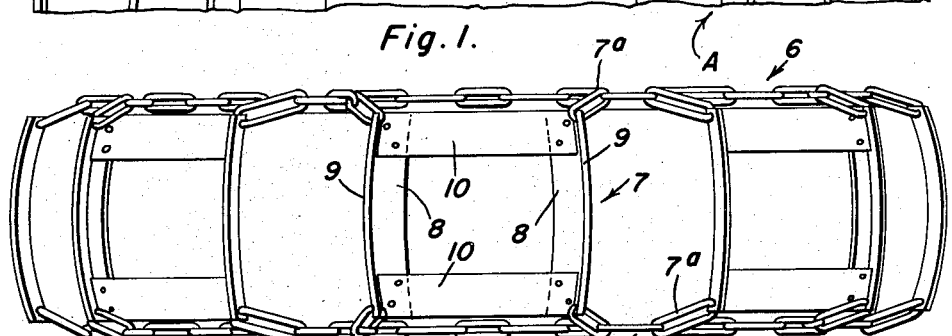
Figure 2 is a plan view of the assemblage seen in Figure 1.

In the drawings the tractor wheel is denoted generally by the reference character A, the same being of a heavy duty type (8 to 12 inches) and including a conventional pneumatic tire B.

The improved tire chain comprises suitably constructed side chains 5 and 6 which serve to assemble and hold in place circumferentially spaced traction units 7, said traction units being connected centrally and properly to the side chains by transverse cross chain links 8.

Figures 3, 4:
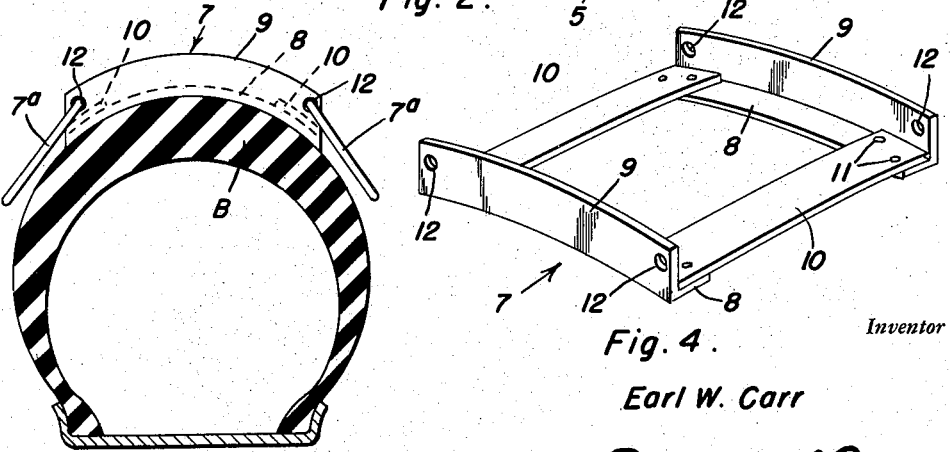
Figure 3 is a cross section on the line 3—3 of Figure 1, looking in the direction of the arrows.
Figure 4 is a perspective view of one of the improved traction units per se.

Reference being had to the detailed construction of the traction unit 7 in Figure 4 it will be seen that it is of rectangular openwork design and comprises a pair of transversely disposable duplicate angle irons. These angle irons are longitudinally bowed to conform to the curvature of the coacting thread portion of the tire, in an obvious manner. The inner foundation flanges 8 rest in firm contact with the tire while the outstanding flanges 9 form the traction lugs. The assembling and connecting bars 10 are flat and rectangular in cross sectional form and have their end portions riveted or otherwise securely fastened as at 11 to the outer end portion of the foundation flanges 8. The outer end portions of the outstanding or vertical flanges 9 have apertures 12 to accommodate the assembling links 8. It will be noted that the bars 10 are connected to the outer surfaces of the flanges 8 and thus the flanges 8 are in direct contact with the tire while the bars 10 are spaced slightly from the surface of the tire.

The traction units herein shown and described and forming the essential improvements in the overall chain construction embody transverse lugs only and are therefore not to be confused with so-called anti-slipping and non-skid traction units such as are embodied in chains used on vehicles driven over city streets, roads and the like. There is no need in connection with farm tractors to counteract sidewise slipping and therefore the unit herein disclosed is primarily and essentially a mud lug for effective traction accomplishment. By employing an open work rigid metal or equivalent frame stability and sure-grip traction results are assured. Also, there is sufficient flexibility in the chain construction that during the motion of the wheel, the traction units, when not in contact with the ground are freely agitated and thus have a tendency to be substantially self-clearing.

Changes in shape, size, materials and rearrangement of details and parts may be resorted to in actual practice, so long as they do not depart from the spirit of the invention or the scope of the appended claims, as is well understood.

Having described the invention, what is claimed as new is:

1. As a new article of manufacture and as a component part of a tractor tire chain of the class shown and described, a rigid traction unit comprising an open rectangular frame embodying a pair of duplicate longitudinally bowed angle irons adapted to extend transversely across and in contact with the tread portion of a pneumatic tire, corresponding flanges of the respective angle irons extending outwardly of said tread to function as traction lugs and being apertured at their opposite ends to accommodate assembling and retaining chains, the remaining tread contacting flanges being in the same plane with each other and directed toward each other, thus disposing the first named lug flanges in directions away from each other, and a pair of rigid connecting bars, said bars being relatively narrow and of small cross sectional dimension, said bars being superimposed on the outer faces of the tread flanges, being located at the extreme outer ends of said angle irons, having their end portions abutting the lug flanges and rigidly secured to the tread flanges.

2. A mud lug for a tractor tire chain comprising a pair of spaced parallel rigid connecting bars, said bars being longitudinally bowed to conform with coacting portions of a tractor tire, and a pair of duplicate lug units, each unit embodying a transversely disposable and curved tread flange horizontally underlying and rigidly joining corresponding ends of said bars together, and a vertical lug flange disposed at right angles to said tread flange and connecting bars, the respective longitudinal edges of said bars being flush with the adjacent ends of said tread and lug flanges, and the end portions of the respective tread flanges having holes to accommodate tire chains.

EARL W. CARR.

REFERENCES CITED

The following references are of record in the file of this patent:

UNITED STATES PATENTS

| Number | Name | Date |
|---|---|---|
| 1,257,379 | Mueller | Feb. 26, 1918 |
| 1,270,550 | Poling | June 25, 1918 |
| 1,309,020 | Creek | July 8, 1919 |
| 1,733,308 | Lawrence | Oct. 29, 1929 |
| 2,065,810 | Karon | Dec. 29, 1936 |